(12) United States Patent
Lotfalian

(10) Patent No.: US 12,196,499 B2
(45) Date of Patent: Jan. 14, 2025

(54) ENERGY STORAGE AND RETRIEVAL SYSTEM COMPRISING A REGENERATOR AND AN ELECTRICAL MACHINE COUPLED TO A COMPRESSOR AND AN EXPANDER

(71) Applicant: KAAJ ENERGY INC., Ottawa (CA)

(72) Inventor: Reza Lotfalian, Ottawa (CA)

(73) Assignee: KAAJ ENERGY INC., Ottawa (CA)

( * ) Notice: Subject to any disclaimer, the term of this patent is extended or adjusted under 35 U.S.C. 154(b) by 149 days.

(21) Appl. No.: 18/002,174

(22) PCT Filed: Jun. 17, 2021

(86) PCT No.: PCT/IB2021/055378
§ 371 (c)(1),
(2) Date: Dec. 16, 2022

(87) PCT Pub. No.: WO2021/255694
PCT Pub. Date: Dec. 23, 2021

(65) Prior Publication Data
US 2023/0243600 A1 Aug. 3, 2023

(30) Foreign Application Priority Data
Jun. 17, 2020 (CA) .............................. CA 3083702

(51) Int. Cl.
*F28D 20/00* (2006.01)
*F01K 3/02* (2006.01)
(Continued)

(52) U.S. Cl.
CPC ............ *F28D 20/0056* (2013.01); *F01K 3/02* (2013.01); *F01K 3/12* (2013.01); *F01K 25/10* (2013.01);
(Continued)

(58) Field of Classification Search
CPC .... F28D 20/0056; F28D 17/005; F28D 17/04; F01K 3/02; F01K 3/12; F01K 25/10; H02K 7/1823; H02K 2213/03
See application file for complete search history.

(56) References Cited

U.S. PATENT DOCUMENTS

2009/0322089 A1* 12/2009 Mills ....................... F24S 20/20
290/52
2022/0196341 A1* 6/2022 Young ..................... B65G 5/00

FOREIGN PATENT DOCUMENTS

EP          2530283 A1   12/2012
WO     2019110655 A1    6/2019

OTHER PUBLICATIONS

International Search Report and Written Opinion of PCT/IB2021/055378.

* cited by examiner

*Primary Examiner* — Shafiq Mian
(74) *Attorney, Agent, or Firm* — FASKEN MARTINEAU DUMOULIN LLP; Alain M. Leclerc

(57) ABSTRACT

The present disclosure is directed to an energy storage and retrieval system for the generation of power. A compressor (301) pressurizes ambient air. The pressurized air flow passes through a thermal energy regenerator (280) for thermal energy storage and retrieval and onto an expander (302) for generating mechanical power. The compressor (301) and the expander (302) are coupled to an electrical machine (304) through a common shaft (303). The regenerator (280) comprises one or more Thermal Energy Storage (TES) units which can be coupled to one another in a parallel configuration. The TES units comprise a thermal medium for the storage and retrieval of thermal energy.

20 Claims, 7 Drawing Sheets

(51) Int. Cl.
*F01K 3/12* (2006.01)
*F01K 25/10* (2006.01)
*F28D 17/00* (2006.01)
*F28D 17/04* (2006.01)
*H02K 7/18* (2006.01)

(52) U.S. Cl.
CPC ............ F28D 17/005 (2013.01); F28D 17/04 (2013.01); H02K 7/1823 (2013.01); *H02K 2213/03* (2013.01)

ENERGY STORAGE AND RETRIEVAL SYSTEM COMPRISING A REGENERATOR AND AN ELECTRICAL MACHINE COUPLED TO A COMPRESSOR AND AN EXPANDER

CROSS-REFERENCE

This Application claims priority to Canadian Patent Application Ser. No. 3,083,702 filed on Jun. 17, 2020 ("A PROCESS AND METHOD FOR WASTE HEAT RECOVERY, COMBINED HEAT AND POWER, AND ELECTRICITY STORAGE APPLICATIONS"), which is entirely incorporated herein by reference.

BACKGROUND a) Field

The subject matter generally disclosed herein relates to energy efficiency, energy storage, and electricity and heat generation fields. In the Waste Heat Recovery application, the invention repurposes waste heat to reduce fossil fuels or electricity consumption for air, water, or process heating. In the Combined Heat and Power application, high quality waste heat is used to generate electricity as well as air, water, or process heating in order to reduce carbon footprint of energy and provide savings on electricity and fuel bills. In the Electric Storage application, the proposed solution stores electricity generation surplus or off-peak electricity, and delivers it back in form of electricity and heat to the client upon demand, providing electricity and fuel bill savings and enhancing the integration and utilization of renewable sources such as wind and solar power.

b) Related Prior Art

Energy efficiency and reducing carbon footprint of energy supply are key aspects in mitigating climate change. Two major ingredients towards this are waste heat recovery and energy storage in residential, commercial, industrial and utility sectors.

Waste heat recovery is relevant when a source of heat is released into environment, usually in form of the flue gas of a boiler, an oven, a furnace, or an engine.

In conventional Waste heat recovery applications, waste heat is captured and repurposed into space heating, water heating, process air preheating, or process feed preheating applications. This practice provides considerable reduction in fossil fuel consumption and carbon emissions. If the waste heat is of high quality, it can be used to generate useful heat as well as electricity using a thermodynamic machine. Such Combined Heat and Power application reduces fuel consumption, electricity consumption, and carbon emissions for the clients.

Another aspect of wasting energy is electricity curtailment due to generation surplus condition. This could happen during off-peak hours when base load generation by nuclear and hydro plants surpass demand. Another situation is when intermittent sources of power such as wind and solar generation exceed the demand. During peak hours, on the other hand, due to shortage of supply, carbon-emitting plants such as gas and coal generation are used to meet the power demand. Electricity storage is a key element of future grids and microgrids to avoid curtailment of clean electricity by storing the generation surplus and returning it to the client during peak hours. This is essential to maximize integration and utilization of clean intermittent sources of power and to reduce dependence on fossil fuels for power generation.

One of current Waste Heat Recovery technologies is conventional heat exchangers. The heat exchangers use fins, plates and tubes to reach desired heat transfer between the heat source and the cold source, while avoid mixing the two flows. Despite being a mature technology, the heat exchangers are expensive for many applications because the fins, plates, and tubes are usually made of high-grade steel. Fouling, which is accumulation of unwanted deposits on the surface of fins and tubes, impacts the performance of heat exchangers and imposes maintenance or replacement costs, adding to the life-cycle cost of heat exchangers. Furthermore, considerable amount of steel used for fins, tubes and plates results in significant environmental footprint for heat exchangers.

Another type of current Waste Heat Recovery technology are regenerators that store heat by passing the heat source through a network of solid structures, such as honeycomb or cubic bricks, and later capturing the heat by passing the cold source through the structure. CA 1072486 describes one such solution. These solutions are typically expensive mainly due to the cost of bricks and the cost of building the structure. They are well-suited for atmospheric flows, but if the heat or cold flow is under pressure, their chamber is not designed to carry pressure.

A third approach is using packed bed regenerators, where a plurality of granular material are used to form a packed bed inside a channel. The heat source passes through the channel to heat up the packed bed. Later, the cold source enters the channel to capture heat from the packed bed. CA 2842930 provides methods of optimizing performance of packed beds, and provides a solution with a series of packed beds separated by insulating layers. In a simpler configuration, CA 2866273 proposes two packed beds operating in series for to maximize heat recovery from a flue gas. It would be of practical and economical interest to avoid operation of the packed beds in series to reduce the design complexity and the amount of piping and valving required. It would be desirable, therefore, to design a packed bed with no units operating in series.

Conventional Combined Heat and Power technologies are known to include a steam cycle. A boiler uses the waste heat to generate steam which runs a steam turbine for electricity generation. A condenser is required to bring water back to liquid phase to reach a closed cycle. A water treatment unit is also needed to ensure water quality requirement is met for safe operation of the boiler, condenser, and steam turbine. The output heat from the condenser is used for water heating, air heating, or process heating applications.

Alternative Conventional Combined Heat solutions use other working fluids, such as ammonia or CO2 to reach higher efficiency. Despite the advantage of supplying both electricity and heat, these CHP solutions have downsides. The boiler and the condenser units contribute to a considerable portion of the capital expenditure of these CHP solutions. These units also impose a high impact on the project footprint, and space limitations may make a project not viable.

An alternative Conventional Combined Heat solution is using Brayton Cycle where air is the working fluid. A gas turbine, composed of a compressor, an expander, and a generator is used for power generation. CA 3045185 provides a Conventional Combined Heat solution where the compressor pressurizes ambient air and sends it to a recuperator, which captures heat from a waste heat source and delivers it to the pressurized air. The heated air enters the expander for power generation and the expander exhaust, which is still hot, is sent to an organic Rankine cycle for more power generation. Such solution does not use water and steam for power generation and, therefore, eliminates water treatment unit, boiler and condenser, resulting in a smaller footprint and lower cost compared to steam cycles. However, it still uses conventional recuperators which have high capital and maintenance costs. One possible approach to improve this concept is to use a packed bed of rocks as a regenerator instead of the aforementioned conventional recuperators.

Electricity Storage solutions are mainly batteries, Pumped Hydro ("PH"), and Compressed Air Energy Storage ("CAES") systems. There is a variety of battery technologies including Li-ion, lead acid, and flow batteries, each having its own characteristics such as efficiency, lifespan, and cost. Batteries are mainly suitable for short duration of storage (<2 hours) in transportation, residential and commercial applications. On the grid scale batteries are usually used for short-term applications such as frequency control. Each battery cell is the power unit as well as the energy unit. Therefore, to have longer duration of storage, more cells should be stacked, making the cost scale with the required storage capacity. The cost and short lifespan of batteries make it challenging to use them for grid-scale applications.

An alternative grid-scale solution is pumped hydro, where water is pumped from downstream (a lake or a dam) to upstream (a lake or a dam) for storing energy, and water goes from upstream to downstream to run a turbine for power generation. Pumped-hydro solutions provide long storage duration and long lifespan. However, they need proper geology, considerable amount of water, and significant civil work which raises environmental concerns. The other alternative is the Compressed Air Energy Storage concept, which uses air instead of water to store energy. During off-peak hours, a compressor is used to pressurize air. The air is stored underground, in either salt caverns or depleted natural gas reservoirs. To generate electricity, the air leaves the reservoir and runs a turbine.

Similar to Pumped-Hydro systems, Compressed Air Energy Storage solutions depend on the availability of proper geology, require considerable civil work, and pose environmental considerations. Compressed Air Energy Storage solutions provide long lifespan and benefit from mature technologies for compressors, turbines, and heat exchangers. However, due to limited geology availability and high capital cost, only few projects are operational or under development since their first development nearly four decades ago.

In an alternative approach towards electricity storage, it is possible to convert electricity into heat and store it in a packed bed of rocks. Then, with a Brayton cycle as described above, a compressor pressurizes the air which gets heated in the packed bed and sent to the expander for power generation. This way, there is no need for storing compressed air, making the solution geology-independent. Such a solution requires minimal civil work and impact on the environment.

Systems where energy in the form of heat may be stored at ambient pressure are also known. For example, U.S. Pat. No. 10,082,104 provides a solution where a load-lock may be used to transfer thermal storage medium at high temperature and atmospheric pressure into a high temperature, high pressure heat exchanger. The use of a load-lock permits the thermal medium to remain at atmospheric pressure during storage. The pressure within the load-locks are preserved or changed based on the operation of pressure seals. The heat storage material, either liquid or solid, moves between a cold storage tank to a hot storage tank. Pressure seals are used to isolate the high-pressure and low-pressure lines and keep the storage tank under no pressure. There is a holding section in the load-lock where the heat source is trapped between the two pressure seals to conduct the heat transfer. This causes fluctuations in the flow rate and pressure. Additionally, such system may require high cost maintenance and repairs due to the pressure seals provide therein. There is a need for a system that uses a packed bed as the storage material that does not move in order to reduce the number of storage tanks and to eliminate moving parts. There is also a need for a continuous system and method with no jumps in the pressure or flow rate as a result of having no holding section. Having less number of tanks also means smaller storage footprint, and no moving part provides a lower operation and maintenance cost.

Other systems where energy may be stored in the form of heat are provided in Patent Application no. US20210054785A1, which provides a closed thermodynamic cycle power generation or energy storage system, such as a reversible Brayton cycle system, may include at least a working fluid circulated through a closed cycle fluid path including at least two heat exchangers, a turbine, and a compressor. Some systems may include a plurality of closed cycle systems (power subunits), each configured to be connected to or isolated from a shared hot side thermal store and a shared cold side thermal store. The working fluid can undergo a thermodynamic cycle operating at one, two or more pressure levels. For example, the working fluid may operate in a closed cycle between a low-pressure limit on a cold side of the system and a high-pressure limit on a hot side of the system. In some implementations, a low-pressure limit of about 10 atmospheres (atm) or greater can be used. In some instances, a sub-atmospheric low-pressure limit may be used. For example, the low-pressure limit may be less than about 0.1 atm, less than about 0.2 atm, less than about 0.5 atm, or less than about 1 atm. In some instances, the low-pressure limit may be about 1 atmosphere (atm). However, such system seems to use the pressure to increase and reduce the temperature of the working fluid. The solution provided therein requires two conventional heat exchangers, two hot storage tanks, two cold storage tanks, a pump to move water (cold storage material) from one cold storage tank to the other cold storage tank, and a pump to move molten salt (hot storage material) from one hot storage tank to the other hot storage tank. There is the need for a solution wherein the heat storage material itself provides the heat transfer surface and, therefore, the conventional heat exchangers are eliminated, while providing a smaller footprint, lower capital cost, and lower maintenance cost compared to the Patent Application US20210054785A1.

The present patent application proposes systems and methods for Waste Heat Recovery, Combined Heat and Power applications, and Electricity storage applications having one or more Thermal Energy Storage units composed of packed bed of natural granular material. The proposed methods and processes required low capital investment, reduce energy cost and green-house emissions for users, providing a swift payback, and have minimal environmental impact over their long lifespan of >20 years.

SUMMARY

Waste Heat Recovery ("WHR"), Combined Heat and Power ("CHP"), and Electricity Storage ("ES") solutions are proposed around a Thermal Energy Storage ("TES") concept. The TES uses natural granular material such as rocks and ores as heat storage material, depending on the temperature and composition of the heat and cold flows.

The granular material is placed inside a container such as a tube, pipe, or duct, forming a porous media for the heat and cold flows to pass through. The container is equipped with piping and valves to control and direct the cold and heat flows to/from the container. Proper sensors are provided to monitor pressure, temperature, and flow rate at different stations. The container is also insulated to minimize heat loss and ensure efficiency requirements are met.

For the Waste Heat Recovery application, a proposed regenerator system is composed of two or more TES units. In a preferred two-TES configuration, one TES captures heat from a waste heat source, such as flue gas of a furnace. The other TES, which is heated from the previous cycle, heats up a cold flow, such as inlet air of the furnace. When the first TES is fully heated and the second TES is cooled down, the valves change the flow of heat and cold flows between the two TES units to repeat the process. This regeneration process reduces fuel consumption and carbon emissions, and provides energy bill savings for a subject.

For the Combined Heat and Power (CHP) system, the aforementioned regenerator solution is coupled to a turbine, microturbine, or turbocharger to convert the waste heat into electricity as well as useful heat. This is a viable solution when the waste heat temperature is above 500° C. In lower temperatures, heat quality is not sufficient for efficient electricity generation, and therefore, a Waste Heat Recovery solution is a more suitable approach. The Combined Heat and Power concept provides emissions reduction as well as savings on fuel and electricity bills.

In the Electricity Storage (ES) application, during off-peak hours electricity is converted to high quality heat using a heat pump or an electrical heater. The high-quality heat is stored in a TES. To generate electricity during peak hours, the stored heat is used to run a turbine, a microturbine, or a turbocharger. A regenerator, as described above, is used to capture heat from the turbine exhaust and preheat the compressor's pressurized air before entering the TES for efficiency improvement. The turbine exhaust after leaving the regenerator is still hot, which can be used for water heating, space heating, and process heating purposes.

The Electricity Storage (ES) application may be used in residential, commercial, and industrial scales to benefit from electricity price arbitrage between off-peak and peak hours. It can also be used to store surplus generation of in-house PV panels and deliver it back to the client during peak hours. In the utility scale application, the Electricity Storage (ES) application is suitable for long-term storage and balancing the mismatch between supply and demand. Long-term storage is especially crucial to increase the integration and capacity of intermittent power sources such as wind and solar.

In another embodiment, there is provided a method for controlling the storage and retrieval heat stored in a thermal medium, the method comprising:
  providing a thermal medium for storing energy in the form of heat;
  providing a first flow of cold source;
  providing a second flow of cold source;
  providing a first flow heat source;
  providing a second flow of heat source;
  providing Thermal Energy Storage (TES) unit system comprising two to four Thermal Energy Storage (TES) units fluidly coupled to one another in a parallel configuration by a plurality of manifolds and a plurality of two- or three-way valves for controlling the storage and retrieval heat stored in the thermal medium, wherein a first set of valves controls the first flow of cold source to the TES units, wherein a second set of valves controls the second flow of cold source from the TES units, wherein a third set of valves controls a first flow of heat source to the TES units, and wherein a fourth set of valves controls a second flow of heat source from the TES units;
  charging the thermal medium with heat by controlling a coordinated aperture and closure of the plurality of valves, wherein a seamless supply of heat is provided from the first and second flow of heat source; and
  discharging the thermal medium from heat by controlling the coordinated aperture and closure of the plurality of valves, wherein a seamless supply of cold source is provided from the first and second flow of could source,
  wherein a Thermal Energy Storage (TES) unit gets fully charged by the heat source before directing the heat source to a pre-discharged second Thermal Energy Storage (TES) unit for charging the second Thermal Energy Storage (TES) unit, and concurrently a third Thermal Energy Storage (TES) unit gets fully discharged by the cold source before directing the cold source to a fourth pre-charged Thermal Energy Storage (TES) unit for discharging the fourth Thermal Energy Storage (TES) unit.

The first and second flow of cold and heat source may be ambient air at a first pressure, pressurized air at a second pressure, or a combination thereof.

According to an embodiment, there is provided an energy storage and retrieval system for the generation of power, comprising:
  a thermal medium for storing energy in the form of heat;
  a regenerator comprising a plurality of Thermal Energy Storage (TES) units comprising a plurality of manifolds and a plurality of two- or three-way valves for controlling the storage and retrieval heat stored in the thermal medium; and
  a heat engine comprising an electrical machine mounted on a shaft, the electrical machine mechanically coupled to a compressor and to an expander, wherein the compressor receives ambient air at a first pressure and pressurizes the ambient air to a second pressure, and wherein the pressurized air flow passes through the regenerator onto the expander generating mechanical power.

The regenerator may comprise two Thermal Energy Storage (TES) units fluidly coupled in a parallel configuration by a plurality of manifolds and a plurality of three-way valves for controlling the storage and retrieval heat stored in the thermal medium.

The regenerator may comprise four Thermal Energy Storage (TES) units fluidly coupled to one another in a parallel configuration by a plurality of manifolds and a plurality of two-way valves for controlling the storage and retrieval heat stored in the thermal medium.

The first pressure may be atmospheric pressure and the second pressure may be greater than atmospheric pressure.

In another embodiment, there is provided a method for generating electricity from stored heat, the method comprising:
  providing a system comprising a thermal medium for storing energy in the form of heat, a regenerator comprising a plurality of Thermal Energy Storage (TES) units comprising a plurality of manifolds and a plurality of two- or three-way valves for controlling the storage and retrieval heat stored in the thermal medium; and a heat engine comprising an electrical machine mounted on a shaft, the electrical machine mechanically coupled to a compressor and to an expander;

receiving ambient air at a first pressure into the system;

pressurizing the ambient air at a second pressure in the compressor;

directing the pressurized air through the regenerator to get heated; and directing the heated pressurized air from the regenerator through the expander to generate mechanical power to activate the compressor and generate electricity in the electrical machine.

The first pressure may be atmospheric pressure and the second pressure may be greater than atmospheric pressure.

In another embodiment, there is provided an energy storage and retrieval system for the conversion of excess electricity into heat and use of heat to generate power and useful heat, the system comprising:

a thermal medium for storing energy in the form of heat;

a heat engine comprising an electrical machine mounted on a shaft, the electrical machine mechanically coupled to a compressor and to an expander;

an electrical heater for converting electricity into heat, fluidly coupled to a first Thermal Energy Storage (TES) unit comprising the thermal medium, wherein the first Thermal Energy Storage (TES) unit is configured to store and retrieve heat and operates at a first pressure;

a first regenerator comprising Thermal Energy Storage (TES) units comprising the thermal medium configured to operate at the first pressure and also at a second pressure, and fluidly coupled to the first Thermal Energy Storage (TES) unit and to a second regenerator, wherein the first regenerator is configured to operate at the first pressure allowing air to flow in a close cycle between the first Thermal Energy Storage (TES) unit and the first regenerator, and wherein the first regenerator is configured to operate at the second pressure allowing air to flow in an open cycle from the second regenerator to the first regenerator to the expander; and a second regenerator comprising Thermal Energy Storage (TES) units comprising the thermal medium and configured to operate at the first and the second pressure, the second regenerator fluidly coupled by a plurality of manifolds and a plurality of two- or three-way valves for controlling the storage and retrieval medium-temperature thermal energy from the expander output air to the compressor output air, wherein the compressor pressurizes ambient air, the pressurized air flows in an open cycle including, in sequence, to the second regenerator, the first regenerator, and the expander for generating mechanical power;

storing heat in the form of energy by:
converting electricity in the form of a flow of heat in the electrical heater;
circulating the flow of heat into the first Thermal Energy Storage (TES) unit to store the heat; or generating power and useful heat from a heat source by:
receiving ambient air at a first pressure into the system;
pressurizing ambient air at a second pressure in the compressor;
directing the pressurized air through the second regenerator to get pre-heated by the outlet air of the expander;
directing the pressurized air through the first regenerator (290) to get heated using the heat from the first Thermal Energy Storage (TES); and,
directing the heated pressurized air from the first regenerator through the expander to generate mechanical power, wherein the mechanical power activates the compressor and generates electricity in the electrical machine.

The first and the second regenerators may each comprise two Thermal Energy Storage (TES) units fluidly coupled to one another in a parallel configuration by a plurality of manifolds and a plurality of three-way valves for controlling the storage and retrieval medium-temperature heat.

The first and the second regenerator may each comprise four Thermal Energy Storage (TES) units fluidly coupled to one another in a parallel configuration by a plurality of manifolds and a plurality of two-way valves for controlling the storage and retrieval medium-temperature heat.

The first pressure may be atmospheric pressure and the second pressure may be greater than atmospheric pressure.

In another embodiment, there is provided a method for converting excess electricity in the form of heat and generating electricity and useful heat from the stored heat, the method comprising:

providing an energy storage and retrieval system for the conversion of excess electricity into heat and use of heat to generate power and useful heat, the system comprising:

a thermal medium for storing energy in the form of heat;

a heat engine comprising an electrical machine mounted on a shaft, the electrical machine mechanically coupled to a compressor and to an expander;

an electrical heater for converting electricity into heat, fluidly coupled to a first Thermal Energy Storage (TES) unit comprising the thermal medium, wherein the first Thermal Energy Storage (TES) unit is configured to store and retrieve heat and operates at a first pressure;

a first regenerator comprising Thermal Energy Storage (TES) units, comprising the thermal medium, and fluidly coupled to a first configured Thermal Energy Storage (TES) unit and to the expander, wherein the first regenerator is configured to operate at the first pressure, the regenerator fluidly coupled by a plurality of manifolds and a plurality of valves for controlling the storage and retrieval high-temperature heat or thermal energy, allowing ambient air to flow in a closed cycle between the first Thermal Energy Storage (TES) unit and the first regenerator; and a second regenerator comprising Thermal Energy Storage (TES) units, comprising the thermal medium and configured to operate at a second pressure, the regenerator fluidly coupled by a plurality of manifolds and a plurality of valves for controlling the storage and retrieval medium-temperature heat to the compressor and to the expander;

storing heat in the form of energy by:
converting electricity in the form of a flow of heat in the electrical heater;
circulating the flow of heat into the first Thermal Energy Storage (TES) unit to store the heat; or generating power and useful heat from a heat source by:
receiving ambient air at a first pressure into the system;
pressurizing ambient air at a second pressure in the compressor;
directing the pressurized air through the second regenerator to get pre-heated, directing the pressurized air through the first regenerator (290) to get heated, and directing the heated pressurized air from the first regenerator through the expander to generate mechanical power, wherein the mechanical power activates the compressor and generates electricity in the electrical machine.

In embodiments, the method for converting excess electricity in the form of heat and generating electricity from the stored heat may further comprise a step for generating power from a heat source, the step including:

circulating the flow of heat at the first pressure from the first Thermal Energy Storage (TES) unit to the first regenerator, wherein heat or thermal energy is transferred to an inlet air of the expander to generate mechanical power, wherein the mechanical power activates the compressor and generates electricity in the electrical machine.

In embodiments, the method for converting excess electricity in the form of heat and generating electricity from the stored heat may further comprise a step of using heat flowing from the expander for space heating, water heating, process feed heating, or as preheated air in a boiler, a furnace, or an oven.

The first pressure may be atmospheric pressure and the second pressure may be greater than atmospheric pressure.

In another embodiment, there is provided an energy storage and retrieval system for the generation of power, comprising:

a thermal medium for storing energy in the form of heat;

an electrical machine mounted on a shaft comprising:

a first clutch mechanically coupled to a heat pump of a charging assembly, the charging assembly configured to store high temperature heat at a first pressure, the charging assembly comprising: a heat pump system mechanically coupled to the electrical machine, the heat pump system comprising a first compressor and a first expander; and a second clutch mechanically coupled to a heat engine of a discharging assembly, the discharging assembly configured to generate power and useful heat from heat stored at the first pressure, the discharging assembly comprising: a heat engine mechanically coupled to the electrical machine, the heat engine comprising a second compressor and a second expander;

a regenerator comprising Thermal Energy Storage (TES) units, comprising the thermal medium and configured to operate at the first, or a second pressure, or a third pressure, the regenerator fluidly coupled by a plurality of manifolds and a plurality of two- or three-way valves for controlling the storage and retrieval high-temperature heat, the regenerator fluidly coupled via a first three-way valve to the first compressor and the second expander, and the regenerator fluidly coupled via a second three-way valve to the second compressor and the first expander, wherein a first Thermal Energy Storage (TES) unit is fluidly coupled to the regenerator and is configured to store and retrieve heat at the first pressure; and a second Thermal Energy Storage (TES) unit fluidly coupled to the first compressor, the first expander, and the second expander, wherein the second Thermal Energy Storage (TES) unit is configured to store and retrieve heat at the first pressure, wherein in a charging configuration, the first three-way valve and the second three-way valve activates a first closed air loop between the heat pump system, the second Thermal Energy Storage (TES) unit and the regenerator, while concurrently closing a first open air loop between regenerator and the heat engine, and wherein in a discharging configuration, the first three-way valve and the second three-way valve closes the first closed air loop between the heat pump system, the second Thermal Energy Storage (TES) unit, and the regenerator while concurrently opening the first open air loop between regenerator and the heat engine.

The regenerator may comprise two Thermal Energy Storage (TES) units fluidly coupled in a parallel configuration by a plurality of manifolds and a plurality of three-way valves for controlling the storage and retrieval high-temperature heat.

The regenerator may comprise four Thermal Energy Storage (TES) units fluidly coupled in a parallel configuration by a plurality of manifolds and a plurality of two-way valves for controlling the storage and retrieval high-temperature heat.

The first pressure may be atmospheric pressure and the second pressure and the third pressure may be greater than atmospheric pressure.

In another embodiment, there is provided a method for energy storage and retrieval system for the generation of power and heat, the method comprising:

providing the energy storage and retrieval system for the generation of power;

providing ambient air at a first pressure;

charging the system with heat, comprising the steps of:

activating the charging assembly by engaging the first clutch and disengaging the second clutch to connect the electrical machine to the heat pump, and by actioning the first three-way valve and the second three-way valve to open an air loop between the a heat pump system and the regenerator, and to close an air loop between the regenerator and the a heat engine;

directing the output air of the first expander at the first pressure through the second Thermal Energy Storage (TES) unit to capture heat before delivering it onto the first compressor;

pressurizing the air to a high temperature at a second pressure;

directing the pressurized heated air to regenerator;

delivering heat to regenerator, wherein heat is directed at the first pressure to the first Thermal Energy Storage (TES) unit for storage;

sending the pressurized air from the regenerator output to the first expander to generate power to turn the first compressor; or discharging the system off heat, comprising the steps of:

activating the discharging assembly by engaging the second clutch and disengaging the first clutch to connect the electrical machine to the heat engine, and by actioning the first three-way valve and the second three-way valve to close the air loop between the heat pump system and the regenerator, and to open the air loop between the regenerator and the heat engine, activating the second compressor to pressurize the ambient air at a third pressure;

directing the pressurized air to regenerator to capture the heat;

directing the heated pressurized air to the second expander for power generation to turn the second compressor and action the electrical machine;

sending the output air of the second expander to the second Thermal Energy Storage (TES) unit at the first pressure to heat up the storage material;

delivering the outlet air of the third second energy storage (TES) unit at the first pressure for heating services such as preheated air for space heating, water heating, as preheated air for a boiler, a furnace, or an oven.

The method for energy storage and retrieval system for the generation of power and heat may further comprise a step of charging the system with heat, the step being:

directing the pressurized heated air to first expander for mechanical power generation to partially run the first compressor and to reduce the required electrical charging power by the electrical machine.

The method for energy storage and retrieval system for the generation of power and heat may further comprise a step of discharging the system off heat, the step being:

directing the medium temperature output air of the second expander through the second Thermal Energy Storage (TES) unit to off load heat to the thermal medium and produce a low temperature air flow, wherein the low temperature airflow is selected for use in space heating, water heating, process feed heating, as preheated air in a boiler, a furnace, or an oven, and process heating applications.

The first pressure may be atmospheric pressure and the second pressure and the third pressure may be greater than atmospheric pressure.

Unless otherwise specified, the following definitions apply:

The terms "thermal medium" or "heat storage media" are intended to be used as and to be interchangeable terms. It is intended to mean a granular natural material such as gravel, rocks, and ores, such as iron ore, or a mixture of those having a particle size between 10 mm to 100 mm and a ragged surface and of irregular shape.

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present. As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein, the term "consisting of" is intended to mean including and limited to whatever follows the phrase "consisting of". Thus, the phrase "consisting of" indicates that the listed elements are required or mandatory and that no other elements may be present.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

The term "about" is used to indicate that a value includes an inherent variation of error for the device or the method being employed to determine the value.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Figure 1:
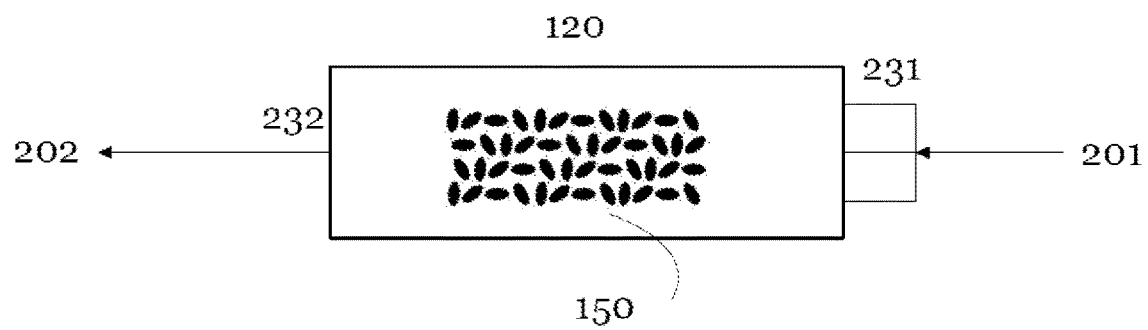
FIG. 1 shows a schematic view of a Thermal Energy Storage (TES) unit.

According to embodiments, there is provided a waste heat recovery system suitable for capturing waste heat and repurposing it into useful heat. In particular, referring now to FIG. 1, there is provided an embodiment of a Thermal Energy Storage (TES) unit (120) in the form of a container comprising a vessel, tube or pipe configured to contain a packed bed of thermal medium (150) or of heat storage media (150) and allow the passage of a working fluid (201, 202). The Thermal Energy Storage (TES) unit (120) may comprise a plurality of manifolds (231, 232) with a single or multiple entrances on each side of the Thermal Energy Storage (TES) unit (120) for controlling the storage and retrieval heat.

The heat storage media may be granular natural material such as gravel, rocks, and ores, or a mixture of those depending on the target storage temperature. Preferably, the granular material is iron ore. The preferred particle size of the granular material may be between 10 mm to 100 mm. It is also preferred that the particles have a ragged surface and irregular shape rather than a smooth surface for heat transfer improvement.

The packed bed of the granular material inside the container may be configured to create a porous channel for the working fluid to pass through. The surface of the granular material may provide the required heat transfer surface to exchange heat between the granular material and a working fluid, thus eliminating the need for conventional heat exchangers for that purpose.

The container may be supported by insulation to manage heat loss. The Thermal Energy Storage (TES) unit (120) may be equipped with a control system which reads signals from temperature, pressure and flow sensors and communicates with a master control system.

Thermal Energy Storage (TES) unit (120) may also comprise a filter unit, such as a cyclone can also be installed at the inlet and outlet manifolds (231, 232) of the container. Proper piping and valving may be supplied to control the flow of the heat source and the cold source in and out of the Thermal Energy Storage (TES) unit (120).

The Thermal Energy Storage (TES) unit (120) may operate in two modes. In a charging mode, a heat source is passed through the Thermal Energy Storage (TES) unit (120), heating up the storage material (150). In a discharging mode, a cold source passes through the Thermal Energy Storage (TES) unit (120) and captures heat from the granular media (150).

The Thermal Energy Storage (TES) unit (120) may stay idle between the charging and the discharging modes, wherein the insulation may prevent heat loss through the container and piping body.

The charging and discharging modes do not happen simultaneously and, therefore, there is no mixing of the heat and cold flows. The direction of the heat and cold sources may be co-current or counter-current, depending on the application.

Thermal Energy Storage (TES) unit (120) may be configured to operate at atmospheric pressure or at a pressure greater than atmospheric pressure.

The Thermal Energy Storage (TES) unit (120) may be in cylindrical shape, preferably in a pipe or a tube. This is especially useful when either the heat or cold source is under pressure.

Thermal Energy Storage (TES) unit (120) may be of different shapes for an application that allows the working fluid to flow at atmospheric pressure. Such forms may include a prism, should design and cost considerations favor such a configuration.

Depending on the working pressure and temperature, the ends of the vessel of Thermal Energy Storage (TES) unit (120) may be hemispherical, semi-elliptical, or flat. The ends are attached to the main body with flanges for accessibility to the heat storage material when a replacement or maintenance is required.

The Thermal Energy Storage (TES) unit (120)'s volume is determined by the required storage capacity, the temperature of the heat and cold sources, and the type of storage media.

The efficiency of the Thermal Energy Storage (TES) unit (120) may be adjusted by changing levels of insulation to manage heat loss.

The heat transfer rate may be adjusted by modifying the working fluid type, its temperature and flow rate, the porosity of the Thermal Energy Storage (TES) unit (120), as well as the size and conductivity of the granular material.

The fluid speed, density, viscosity, as well as the porosity and the size of granular material may also determine the pressure drop inside the Thermal Energy Storage (TES) unit (120). The cross section of the vessel as well as porosity and grain size may be selected to ensure the heat transfer requirement is met, while avoiding excessive pressure drop through the TES.

Preferably, the pressure-drop inside the Thermal Energy Storage (TES) unit (120) is below 3% of the inlet pressure. To avoid excessive pressure loss in the vessel, the ratio of the vessel internal diameter to the particle size may be at least 10, but no more than 1000. The ratio of the vessel length to internal diameter may be at least 1, but not more than 50.

The Thermal Energy Storage (TES) unit (120) diameter may be less than 10 times the diameter of the inlet and outlet pipes. Such configuration minimizes the dead zones inside the Thermal Energy Storage (TES) (120) unit and faster reaches a developed flow inside the Thermal Energy Storage (TES) unit (120).

In the event that the Thermal Energy Storage (TES) unit (120) to pipe diameter is larger than 10, it is preferred to configure the manifolds with multiple pipes entering the Thermal Energy Storage (TES) unit (120), so that the fluid flow is distributed through parallel pipes, providing a more uniform distribution of flow inside the Thermal Energy Storage (TES) unit (120).

A preferred distribution of multiple pipes on the Thermal Energy Storage (TES) unit (120) flange may be the Gauss-Chebyshev distribution.

Thermal Energy Storage (TES) unit (120) may also comprise perforated plates inside in the vicinity of the flanges in order to create a more uniform working fluid flow.

Figure 2:
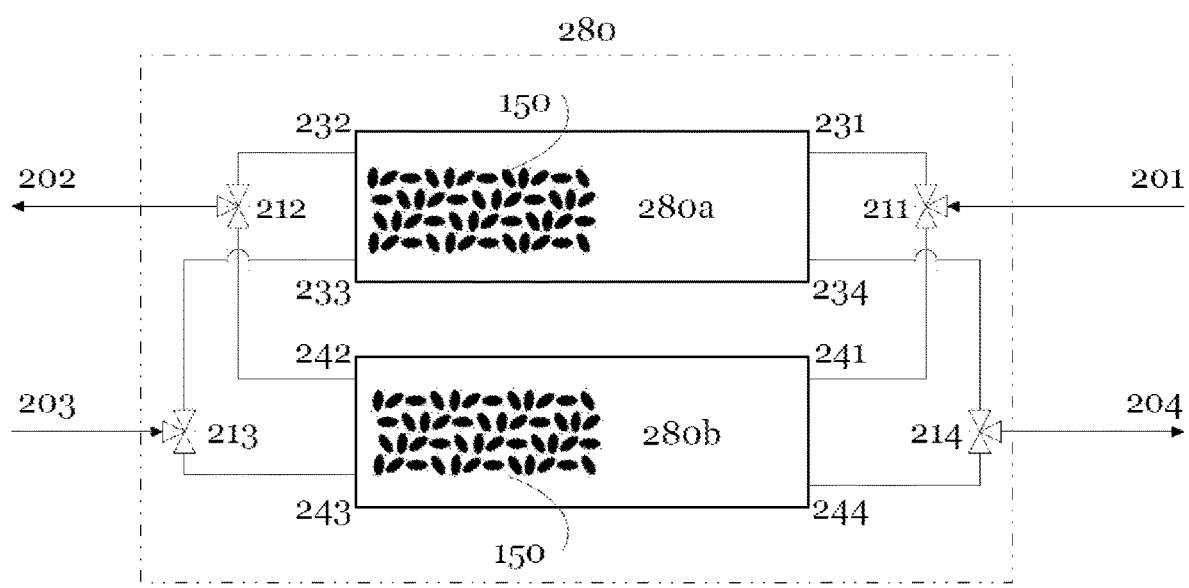
FIG. 2 illustrates a regenerator system for Waste Heat Recovery (WHR) application comprising two Thermal Energy Storage (TES) units operating in parallel.

Referring now to FIG. 2, there is provided a waste heat recovery system suitable for capturing waste heat and repurposing it into useful heat. Such embodiments may be useful in industrial processes where the flue gas of a furnace, an oven, a boiler, a turbine, or an engine is released into the environment at high temperature.

According to an embodiment, there is provided an embodiment of a regenerator (280) comprising two Thermal Energy Storage (TES) units (280a, 280b) fluidly coupled in a parallel configuration, each in the form of a container comprising a vessel, tube or pipe configured to contain a packed bed of thermal medium (150) or of heat storage media (150) and allow the passage of a working fluid (201, 202, 203, 204).

The regenerator may comprise a plurality of manifolds (231, 232, 233, 234, 241, 242, 243, 244) and a plurality of three-way valves (211, 212, 213, 214) for controlling the storage and retrieval heat.

In an embodiment, in the regenerator (280) a three-way valve (211) controls whether the heat source (201) flows to the Thermal Energy Storage (TES) unit (280a) through the inlet manifold (231), or to the Thermal Energy Storage (TES) unit (280b) through the inlet manifold (241). Another three-way valve (212) may gather the heat flow either from the Thermal Energy Storage (TES) unit (280a) through the outlet manifold (232), or from the Thermal Energy Storage (TES) unit (280b) through the outlet manifold (242).

After passing through the regenerator (280) and being cooled down, the flow (202) may be sent to a scrubber for cleaning before entering a chimney. Depending on the composition of the heat source, a filtration system may be required to avoid accumulation of particulates inside the Thermal Energy Storage (TES) units (280a, 280b).

To overcome the pressure-drop inside the Thermal Energy Storage (TES) units (280a, 280b), an induced draft fan may be required to return the gas to the chimney.

A three-way valve (213) may control whether the cold source (203) flows to the Thermal Energy Storage (TES) units (280b) through the inlet manifold (243), or to the Thermal Energy Storage (TES) units (280a) through the inlet manifold (233).

Another three-way valve (214) may gather the cold source either from the Thermal Energy Storage (TES) units (280b) through the outlet manifold (244), or from the Thermal Energy Storage (TES) units (280a) through the outlet manifold (234).

After passing through the regenerator (280) and being heated, the flow (204) may be sent towards a process heating application. This could be a variety of applications such as preheated air that enters a furnace, preheated water that enters a boiler, heated air for process feed heating, and heated air for space heating.

In embodiments, there is provided a two-stage method for charging and discharging the regenerator (280).

In stage one, the Thermal Energy Storage (TES) unit (280a) may be initially at low temperature, i.e. fully discharged, whereas the Thermal Energy Storage (TES) unit (280b) is at high temperature, i.e. fully charged, from the previous stage. The three-way valve (211) directs the heat source (201) through the inlet manifold (231) to the Thermal Energy Storage (TES) unit (280a), where the heat is delivered from the flow to the granular material. The flow exits the Thermal Energy Storage (TES) unit (280a) through outlet manifold (232) where the three-way valve (212) may direct the flow (202) towards a chimney. In parallel and concurrently, the cold source (203) is conducted by the valve (213) to Thermal Energy Storage (TES) unit (280b) through the inlet manifold (243). The flow captures heat from the hot granular material while passing through the Thermal Energy Storage (TES) unit (280b). The flow exits the Thermal Energy Storage (TES) unit (280b) through the outlet manifold (244), and may be directed by the valve (214) towards the heating application (204).

The stage one process may continue until when the Thermal Energy Storage (TES) unit (280a) gets fully charged and the Thermal Energy Storage (TES) unit (280b) gets fully discharged. Then, the valves switch the cold and heat source flow between the two Thermal Energy Storage (TES) units (280a, 280b) in stage two.

In stage two, the three-way valve (211) directs the heat source (201) through the inlet manifold (241) to the Thermal Energy Storage (TES) unit (280b). The heat is delivered from the flow to the granular material inside the Thermal Energy Storage (TES) unit (280b) before exiting the Thermal Energy Storage (TES) unit (280b) from the outlet manifold (242). The valve (212) may direct the flow (202) to a chimney. The three-way valve (213) directs the cold source (203) to the Thermal Energy Storage (TES) unit (280a) through the inlet manifold (233). The heat is delivered from the granular material inside the Thermal Energy Storage (TES) unit (280a) to the flow before the flow exits through the outlet manifold (234). The valve (214) may direct the flow (204) towards a heating application.

The Stage two may continue until the Thermal Energy Storage (TES) unit (280a) is fully discharged and the Thermal Energy Storage (TES) unit (280a) is fully charged. Then, the valves may switch the cold and heat source flow between the two Thermal Energy Storage (TES) units (280a, 280b) back to stage one.

The valves (211, 212, 213, 214) may keep switching the heat and cold flows between the two Thermal Energy Storage (TES) units (280a, 280b) to maintain a continuous operation of the regenerator (280).

The regenerator (280) may be equipped with equipment such as temperature sensors, pressure sensors, flow meters, and pressure relief valves for proper operation and control of the system.

Figure 3:
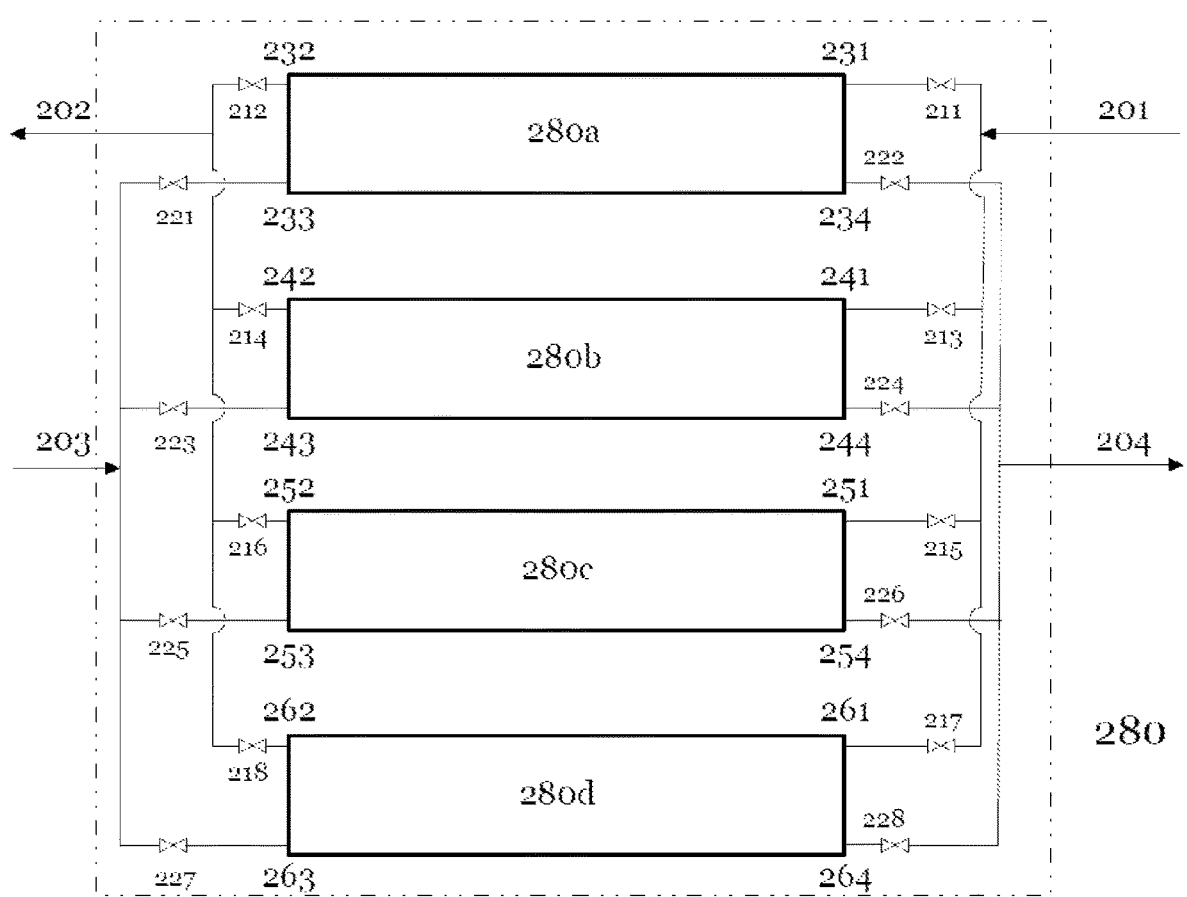
FIG. 3 illustrates a regenerator system for Waste Heat Recovery (WHR) application comprising four Thermal Energy Storage (TES) units operating in parallel.

Referring now to FIG. 3, there is provided a waste heat recovery system suitable for capturing waste heat and repurposing it into useful heat. Such embodiments may be useful in industrial processes where the flue gas of a furnace, an oven, a boiler, a turbine, or an engine is released into the environment at high temperature. This embodiment converts high quality waste heat to useful heat. Compared to FIG. 2, this embodiment provides a smoother heat recovery when there is need for more control on the flow and pressure of recovered heat.

According to an embodiment, there is provided an embodiment of a regenerator (280) comprises four Thermal Energy Storage (TES) units (280a, 280b, 280c, 280d) fluidly coupled in a parallel configuration, each in the form of a container comprising a vessel, tube or pipe configured to contain a packed bed of thermal medium or of heat storage media and allow the passage of a working fluid (201, 202, 203, 204). The regenerator may comprise a plurality of manifolds (231, 232, 233, 234, 241, 242, 243, 244, 251, 252, 253, 254, 261, 262, 263, 264) and a plurality of two-way valves (211, 212, 213, 214, 215, 216, 217, 218, 221, 222, 223, 224, 225, 226, 227, 228) for controlling the storage and retrieval heat.

In an embodiment, still referring to FIG. 3, there is shown a method for controlling the storage and retrieval heat stored in a thermal medium, the method comprising:

providing a thermal medium for storing energy in the form of heat;

providing a first flow of cold source (203) entering the regenerator (280);

providing a second flow of cold source (204) leaving the regenerator (280);

providing a first flow heat source (201) entering the regenerator (280);

providing a second flow of heat source (202) leaving the regenerator (280);

providing regenerator (280) system comprising four Thermal Energy Storage (TES) units (280a, 280b, 280c, 280d) fluidly coupled to one another in a parallel configuration by a plurality of manifolds and a plurality of two-way valves for controlling the storage and retrieval heat stored in the thermal medium, wherein a first set of two-way valves (221, 223, 225, 227) controls the first flow of cold source (203), wherein a second set of two-way valves (222, 224, 226, 228) controls the second flow of cold source (204), wherein a third set of two-way valves (211, 213, 215, 217) controls a first flow of heat source (201), and wherein a fourth set of two-way valves (212, 214, 216, 218) controls a second flow of heat source (202);

charging the thermal medium with heat by controlling a coordinated aperture and closure of the plurality of two-way valves, wherein a seamless supply of heat is provided from the first and second flow of heat source; and discharging the thermal medium from heat by controlling the coordinated aperture and closure of the plurality of two-way valves, wherein a seamless supply of cold source is provided from the first and second flow of could source, wherein a Thermal Energy Storage (TES) unit gets fully charged by the heat source before directing the heat source to a pre-discharged second Thermal Energy Storage (TES) unit for charging the second Thermal Energy Storage (TES) unit, and concurrently a third Thermal Energy Storage (TES) unit gets fully discharged by the cold source before directing the cold source to a fourth pre-charged Thermal Energy Storage (TES) unit for discharging the fourth Thermal Energy Storage (TES) unit.

In an embodiment, the first and second flow of cold and heat source may be ambient air at a first pressure, pressurized air at a second pressure, or a combination thereof.

In an embodiment, the first pressure may be atmospheric pressure and the second pressure may be greater than atmospheric pressure.

Still referring to FIG. 3, the operation logic of the regenerator (280) for controlling the storage and retrieval heat may be applied as follows: 1—Suppose that the TES (280d) is heated from a previous process stage. Valves (227) and (228) are open. The cold source (203) passes through the valve (227) and the inlet manifold (263) into TES (280d) and receives heat before leaving through the outlet manifold (264) and valve (228). Valves (221, 223, 225, 222, 224, 226) are closed. 2—Suppose that TES (280c) is fully charged by heat from the previous stage. 3—Suppose that the TES (280b) is discharged in the previous stage. Valves (213, 214) are open. The heat source (201) passes through valve (213) and the inlet manifold (241), enters TES (280b) and charges (heats up) the granular material before leaving TES (280b) through outlet manifold (242) and valve (214). Valves (211, 215, 217, 212, 216, 218) are closed. 4—Suppose that TES (280a) is fully discharged from the previous stage. 5—When TES (280d) is getting close to being fully discharged, valves (225, 226) start to open gradually, while valves (227, 228) start to close gradually. This provides a seamless supply of heat to the cold source 203 by transitioning from TES (280d) to TES (280c). 6—When TES (280b) is getting close to being fully charged, valves (211, 212) start to open gradually, while valves (213, 214) start to close gradually. This provides a seamless supply of heat from the heat source (201) by transitioning from TES (280b) to TES (280a). 7—The heat charging and discharging loads may be controlled by the valves and alternating the flows between TES 280a, 280b, 280c and 280d as stated herein.

The regenerator tubes are typically sized to charge/discharge within 15-30 minutes, which may allow to maintain a reasonable capital cost by avoiding large TES tubes, and avoid a frequent opening and closing of the valves which may result in a reasonable maintenance cost for the valves.

Figure 4:
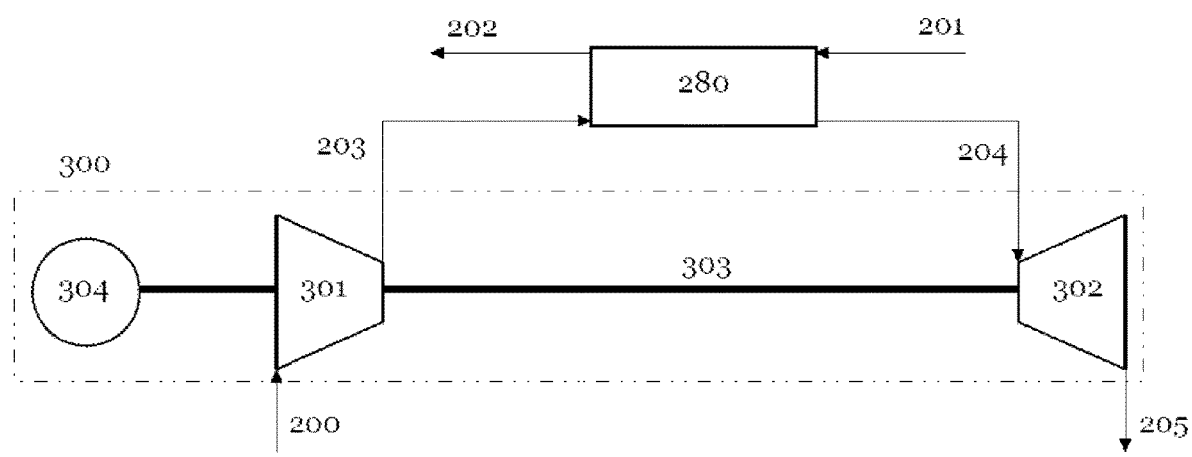
FIG. 4 shows a schematic view of a Combined Heat and Power (CHP) system comprising a regenerator unit, a compressor, an expander, and an electrical machine.

According to an embodiment, and now referring to FIG. 4, there is provided an energy storage and retrieval system for the generation of power, comprising:

a thermal medium for storing energy in the form of heat;

a regenerator (280) comprising a Thermal Energy Storage (TES) units comprising a plurality of manifolds and a plurality of valves for controlling the storage and retrieval heat stored in the thermal medium; and a heat engine (300) comprising an electrical machine (304) mounted on a shaft (303), the electrical machine (304) mechanically coupled to a compressor (301) and to an expander (302), wherein the compressor (301) receives ambient air at a first pressure and pressurizes the ambient air at a second pressure, and wherein the pressurized air flow passes through the regenerator (280) onto the expander (302) generating mechanical power.

The regenerator (280) may comprise two Thermal Energy Storage (TES) units (280a, 280b) fluidly coupled in a parallel configuration by a plurality of manifolds and a plurality of three-way valves for controlling the storage and retrieval heat stored in the thermal medium.

The regenerator (280) may comprise four Thermal Energy Storage (TES) units (280a, 280b, 280c, 280d) fluidly coupled to one another in a parallel configuration by a plurality of manifolds and a plurality of two-way valves for controlling the storage and retrieval heat stored in the thermal medium. The advantage of the four-TES regenerator over the two-TES regenerator is a smoother transition when the flow is switched from one TES to the other.

The first pressure may be atmospheric pressure and the second pressure is greater than atmospheric pressure.

The electrical machine (304) may run in a direct drive configuration where the electrical machine runs at the same speed as the heat engine (300), the power generation will not be at the right frequency, e.g. 50 or 60 Hz.

To generate electricity at the right frequency, e.g. 50 or 60 Hz., the Electrical Machine (304) may be equipped with a drive with a rectifier-inverter. In another approach, the system is not direct drive and there may be a gearbox between the compressor (301) and the electrical machine (304) so that the electrical machine turns at the desired speed, e.g. 1800 rpm.

According to embodiment, and still referring to FIG. 4, there is provided a method for generating electricity from stored heat, the method comprising:

providing a system comprising a thermal medium for storing energy in the form of heat, a regenerator (280) comprising Thermal Energy Storage (TES) units comprising a plurality of manifolds and a plurality of valves for controlling the storage and retrieval heat stored in the thermal medium; and a heat engine (300) comprising an electrical machine (304) mounted on a shaft (303), the electrical machine (304) mechanically coupled to a compressor (301) and to an expander (302);

receiving ambient air at a first pressure into the system; pressurizing the ambient air at a second pressure in the compressor (301);

directing the pressurized air through the regenerator (280) to get heated; and directing the heated pressurized air from the regenerator through the expander (302) to generate mechanical power to activate the compressor (301) and generate electricity in the electrical machine (304).

In an embodiment, the first pressure may be atmospheric pressure and the second pressure is greater than atmospheric pressure.

In an embodiment, a heat source (201) provides heat to the regenerator (280).

In embodiments, the compressor (301) and the expander (302) may run at different speeds by inserting a gearbox between the compressor (301) and the expander (302). If the compressor (301) and the electrical machine (304) do not run at the same speed, a gearbox may also be required between the compressor (301) and the electrical machine (304).

In a preferred configuration, the compressor (301), the expander (302), and the electrical machine (304) run at the same speed. If that speed is different from the synchronous speed, an AC-DC-AC drive, such as a rectifier-inverter, may be used after the generator (280) to provide electricity at the desired frequency. This may avoid the cost, mechanical losses, and long lead time of gearboxes for this system.

The expander outlet flow (205) may be still hot, typically at about 200° C.-500° C. depending on the temperature of the waste heat flow (201) and the pressure ratio of the compressor (301) and expander (302).

The flow (205) may be clean air, as there is no combustion in the heat engine (300). This clean flow can be used as preheated air for a boiler, a furnace, or an oven, or for space heating or water heating applications.

The flow (202) may be typically at about 150° C., which may not be suitable for a heating application as below that temperature, the combination of water vapour with CO2 and NOx in the heat flow may condense to acids, resulting in corrosion and significant impact on the lifespan and maintenance cost for the system. Therefore, the flow (202) may be returned to the scrubber and chimney to be sent into the atmosphere.

The heat engine (300) may be similar to a gas turbine, where the recuperator and the combustion chamber are eliminated. This is sometimes referred to as the powerhead of a gas turbine. Instead of a gas turbine, a microturbine or a turbocharger may be used for this application.

Figure 5:
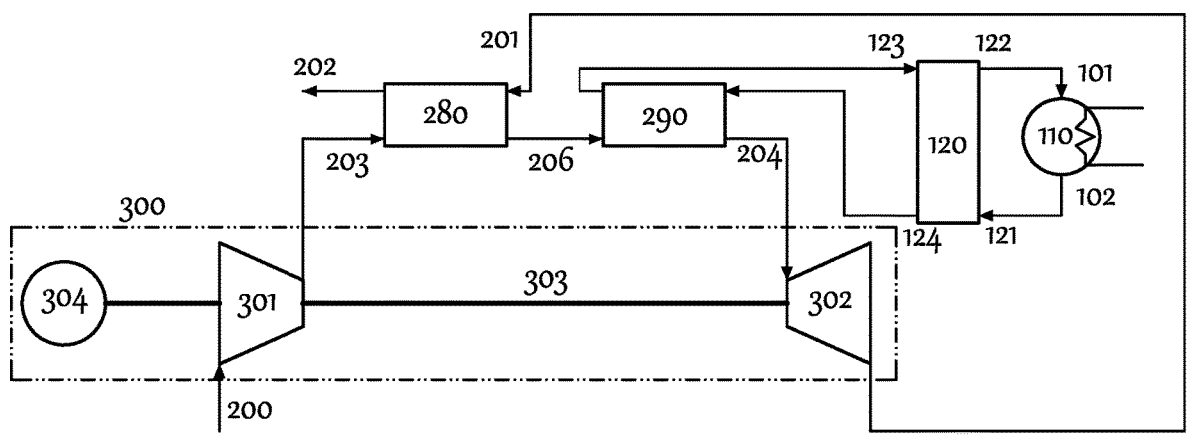
FIG. 5 illustrates an Electricity Storage (ES) system comprising an Electrical Heater (EH) unit, a compressor, an expander, an electrical machine, a Thermal Energy Storage (TES) unit, a high-temperature regenerator for delivering the heat stored in the Thermal Energy Storage (TES) to the expander line while keeping the TES at ambient pressure, and a mid-temperature regenerator to pre-heat the compressor output air with the expander outlet air for efficiency improvement.

According to an embodiment, and referring now to FIG. 5, there is provided an energy storage and retrieval system for the conversion of excess electricity into heat and use of heat to generate mechanical power, the system comprising:
a thermal medium for storing energy in the form of heat;
a heat engine (300) comprising an electrical machine (304) mounted on a shaft (303), the electrical machine mechanically coupled to a compressor (301) and to an expander (302);
an electrical heater (110) for converting electricity into heat, fluidly coupled to a Thermal Energy Storage (TES) unit (120) comprising the thermal medium, wherein the first Thermal Energy Storage (TES) unit (120) is configured to store and retrieve heat and operates at a first pressure;
a first regenerator (290) comprising the thermal medium, and fluidly coupled to the first configured Thermal Energy Storage (TES) unit (120), a second regenerator (280) and to the expander (302), wherein the first regenerator (290) is configured to operate at the first pressure allowing air to flow in a closed cycle between the Thermal Energy Storage (TES) unit (120) and the first regenerator (290), wherein the first regenerator (290) is also configured to operate at a second pressure allowing air to flow from the second regenerator (280) to the first regenerator (290) to the expander (302); and
the second regenerator (280) comprising the thermal medium and configured to operate at a second pressure, the second regenerator (280) fluidly coupled by a plurality of manifolds and a plurality of valves for controlling the storage and retrieval medium-temperature heat to the compressor (301) and from the expander (302), wherein the compressor (301) pressurizes ambient air, the pressurized air flows in an open cycle including, in sequence, to the regenerator (280), the first regenerator (290) and the expander (302) for generating mechanical power.

The second regenerator (280) and the first regenerator (290) may comprise two Thermal Energy Storage (TES) units (280a, 280b) comprising the thermal medium, fluidly coupled in a parallel configuration by a plurality of manifolds and a plurality of three-way valves for controlling the storage and retrieval heat or thermal energy.

The second regenerator (280) and the first regenerator (290) may comprise four Thermal Energy Storage (TES) units (280a, 280b, 280c, 280d) fluidly coupled to one another in a parallel configuration by a plurality of manifolds and a plurality of two-way valves for controlling the storage and retrieval of heat or thermal energy.

The first pressure may be atmospheric pressure.

The second pressure may be greater than atmospheric pressure.

Still referring to FIG. 5, in embodiments, there is provided a method for converting excess electricity in the form of heat and generating electricity from the stored heat, the method comprising:
providing an energy storage and retrieval system for the conversion of excess electricity into heat and use of heat to generate mechanical power, the system comprising:
a thermal medium for storing energy in the form of heat;
a heat engine (300) comprising an electrical machine (304) mounted on a shaft (303), the electrical machine mechanically coupled to a compressor (301) and to an expander (302);
an electrical heater (110) for converting electricity into heat, fluidly coupled to a first Thermal Energy Storage (TES) unit (120) comprising the thermal medium, wherein the first Thermal Energy Storage (TES) unit (120) is configured to store and retrieve heat and operates at a first pressure;
a first regenerator (290) comprising the thermal medium, and fluidly coupled to the configured Thermal Energy Storage (TES) unit (120), to a second regenerator (280) and to the expander (302), wherein the first regenerator (290) is configured to operate at the first pressure allowing air to flow in a closed cycle between the Thermal Energy Storage (TES) unit (120) and the first regenerator (290), wherein the first regenerator (290) is also configured to operate the a second pressure allowing air to flow in an open cycle from the second regenerator (280) to the first regenerator (290) to the expander (302); and
the second regenerator (280) comprising Thermal Energy Storage (TES) units comprising the thermal medium and configured to operate at a second pressure, the regenerator (280) fluidly coupled by a plurality of manifolds and a plurality of valves for controlling the storage and retrieval medium-temperature heat to the compressor (301) and from the output air (201) of the expander (302);

storing heat in the form of energy by:
  converting electricity in the form of a flow of heat in the electrical heater (110);
  circulating the flow of heat into the Thermal Energy Storage (TES) unit (120) to store the heat; or
generating power from a heat source by:
  receiving ambient air (200) at a first pressure into the system;
  pressurizing ambient air (200) at a second pressure in the compressor (301);
  directing the pressurized air through the second regenerator (280) to get pre-heated;
  directing the pressurized air through the first regenerator (290) to get heated;
  directing the heated pressurized air from the first regenerator (290) through the expander (302) to generate mechanical power, wherein the mechanical power activates the compressor (301) and generates electricity in the electrical machine (304);
  directing the output air (201) of the expander (302) to the second regenerator (280) to preheat the pressurized air of the compressor (301); and
  circulating air between the Thermal Energy Storage (TES) unit (120) and the first regenerator (290) at the first pressure to provide the heat required for the expander (302).

The method for converting excess electricity in the form of heat and generating electricity from the stored heat may further comprise a step of using heat flowing (202) from the expander (302) for space heating, water heating, process feed heating, or as preheated air in a boiler, a furnace, or an oven.

The first pressure may be atmospheric pressure.

The second pressure may be greater than atmospheric pressure.

The heat flowing (202) from the expander (302) is typically at 200° C.-250° C., depending on the pressure ratio of the compressor, the storage temperature inside the TES 120, and the heat transfer effectiveness of the regenerator.

The second regenerator (280) may comprise two Thermal Energy Storage (TES) units (280a, 280b) comprising the thermal medium, fluidly coupled in a parallel configuration by a plurality of manifolds and a plurality of three-way valves for controlling the storage and retrieval medium-temperature heat.

The second regenerator (280) may comprise four Thermal Energy Storage (TES) units (280a, 280b, 280c, 280d) fluidly coupled to one another in a parallel configuration by a plurality of manifolds and a plurality of two-way valves for controlling the storage and retrieval medium-temperature heat.

The first regenerator (290) may comprise two Thermal Energy Storage (TES) units (280a, 280b) fluidly coupled in a parallel by a plurality of manifolds and a plurality of three-way valves for controlling the storage and retrieval high-temperature heat.

The first regenerator (290) may comprise four Thermal Energy Storage (TES) units (TES 280a, 280b, 280c, 280d) fluidly coupled to one another in a parallel configuration by a plurality of manifolds and a plurality of two-way valves for controlling the storage and retrieval high-temperature heat.

The first regenerator (290) may receive energy from Thermal Energy Storage (TES) unit (120). Hot air at ambient pressure (124) leaves the Thermal Energy Storage (TES) unit (120) and enters the first regenerator (290) and delivers heat to the granular material contained therein. The cold outlet flow (123) returns to Thermal Energy Storage (TES) unit (120) to capture heat again.

The Thermal Energy Storage (TES) unit (120) may comprise two or more Thermal Energy Storage (TES) subunits fluidly coupled in a parallel or in a series configuration by a plurality of manifolds and a plurality of valves for controlling the storage and retrieval heat.

The air loop between the Thermal Energy Storage (TES) unit (120) and the first regenerator (290) may be at ambient pressure.

The Thermal Energy Storage (TES) unit (120) may be designed under no pressure. This results in significant capital cost reduction and make this a viable solution for long-duration energy storage applications.

The total installed capital cost of the energy storage and retrieval system for the conversion of excess electricity into heat and use of heat to generate mechanical power provided herein may be lower than Li ion batteries when longer than four hours of storage is required.

Figure 6:
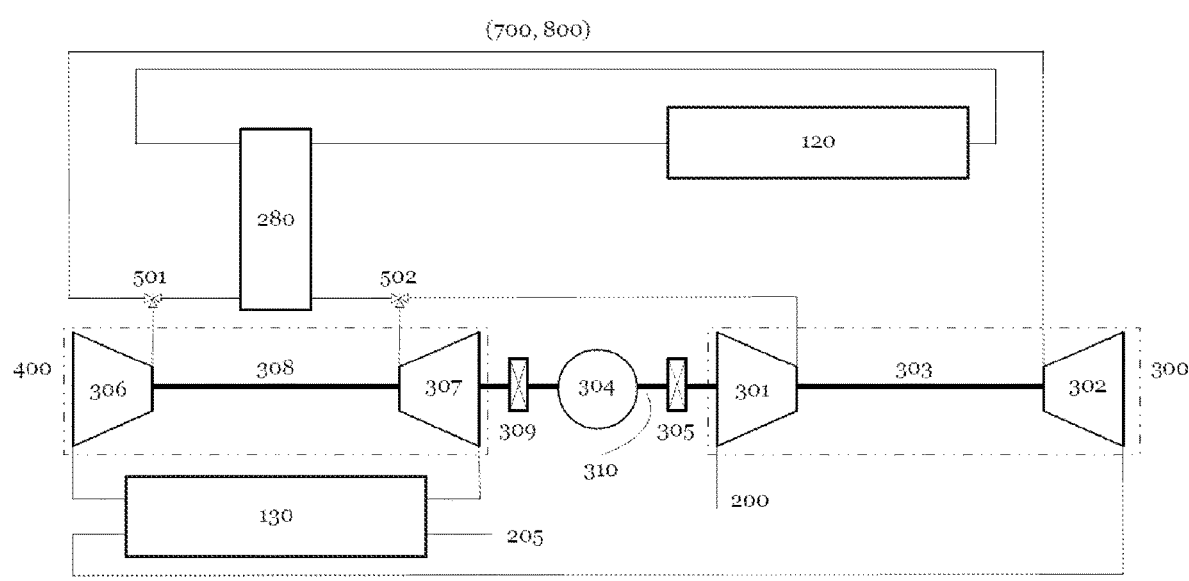
FIG. 6 illustrates an Electricity Storage (ES) system comprising a Heath Engine (HE) unit connected to an Electrical Machine (EM), a Heath Pump (HP) unit, a mid-temperature Thermal Energy Storage (MT-TES) unit, a high-temperature Thermal Energy Storage (HT-TES), and a regenerator unit.
Figure 7:
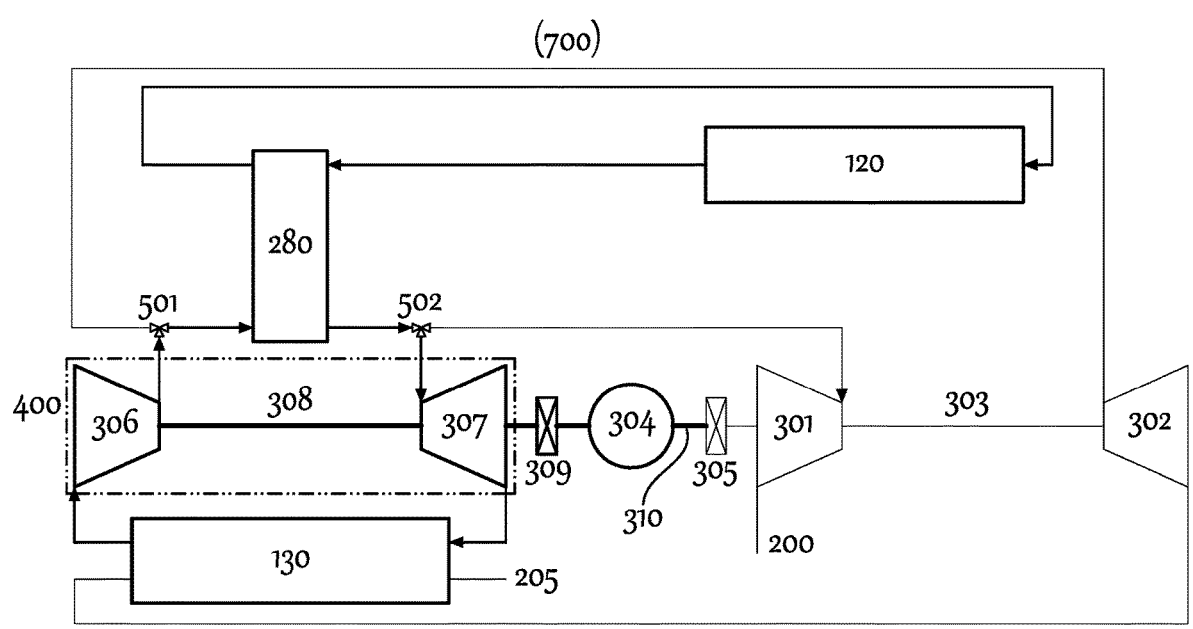
FIG. 7 illustrates an Electricity Storage (ES) system in charging mode comprising a Heath Engine (HE) unit connected to an Electrical Machine (EM), an Heath Pump (HP) unit, a mid-temperature Thermal Energy Storage (MT-TES) unit, a high-temperature Thermal Energy Storage (HT-TES), and a regenerator unit.
Figure 8:
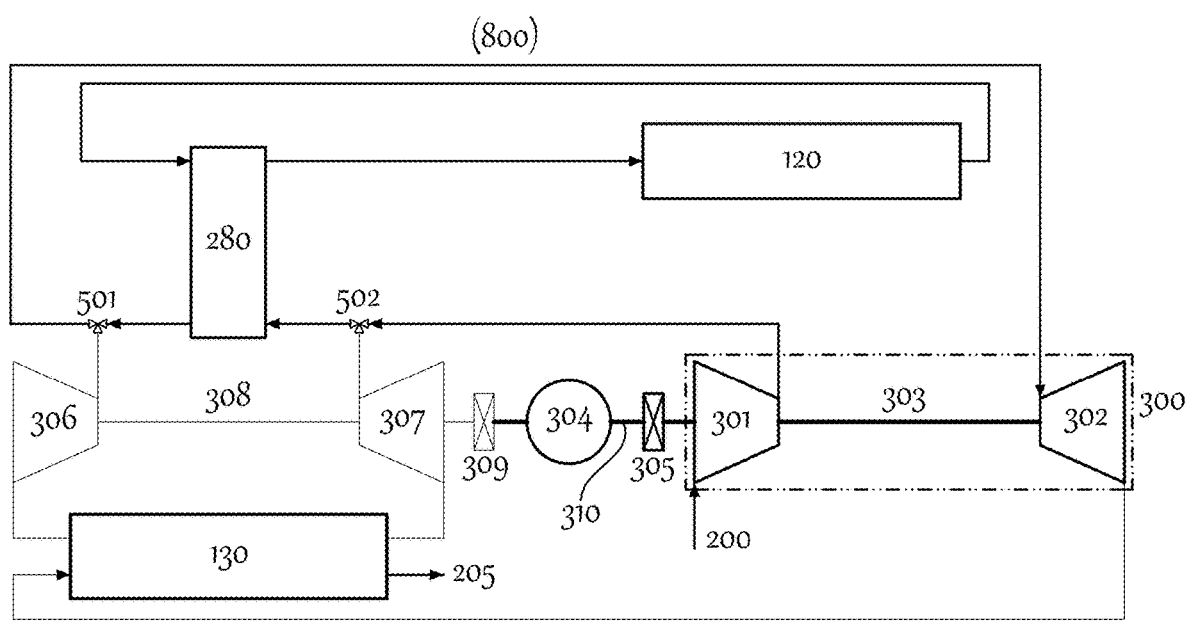
FIG. 8 illustrates an Electricity Storage (ES) system in discharging mode comprising a Heath Engine (HE) unit connected to an Electrical Machine (EM), an Heath Pump (HP) unit, a mid-temperature Thermal Energy Storage (MT-TES) unit, a high-temperature Thermal Energy Storage (HT-TES), and a regenerator unit.

According to an embodiment, and referring now to FIGS. 6, 7 and 8, there is provided an energy storage and retrieval system for the generation of power, comprising:
  a thermal medium for storing energy in the form of heat;
  an electrical machine (304) mounted on a shaft (310) comprising:
    a first clutch (309) mechanically coupled to a first expander (307) of a charging assembly (700), the charging assembly configured to store high temperature heat at a first pressure, the charging assembly (700) comprising: a heat pump system (400) mechanically coupled to the electrical machine (304), the heat pump system comprising a shaft (308), a first compressor (306) and the first expander (307); and
    a second clutch (305) mechanically coupled to a second compressor (301) of a discharging assembly (800), the discharging assembly configured to generate mechanical power from heat at the first pressure, the discharging assembly comprising: a heat engine (300) mechanically coupled to the electrical machine (304), the heat engine (300) comprising a shaft (303), the second compressor (301) and a second expander (302);
    a regenerator (280) comprising Thermal Energy Storage (TES) units comprising the thermal medium and configured to operate at a second pressure in the charging mode and a third pressure in the discharging mode, the regenerator (280) fluidly coupled by a plurality of manifolds and a plurality of valves for controlling the storage and retrieval high-temperature heat or thermal energy, the regenerator (280) fluidly coupled via a first three-way valve (501) to the first compressor (306) and the second expander (302), and the regenerator (280) fluidly coupled via a second three-way valve (502) to the second compressor (301) and the first expander (307), wherein a first Thermal Energy Storage (TES) unit (120) is fluidly coupled to the regenerator (280) and is configured to store and retrieve heat at a first pressure; and
  a second Thermal Energy Storage (TES) unit (130) fluidly coupled to the first compressor (306), the first expander (307), and the second expander (302), wherein the second Thermal Energy Storage (TES) unit (130) is configured to store and retrieve heat at the first pressure, wherein in a charging configuration, the first three-way valve (501) and the second three-way valve (502) activates a first closed air loop between the heat pump system (400), the second Thermal Energy Storage (TES) unit (130) and the regenerator (280), while concurrently closing a first open air loop between regenerator (280) and the heat engine (300), and wherein in a discharging configuration, the first three-way valve (501) and the second three-way valve (502) closes the first closed air loop between the heat pump system (400), the second Thermal Energy Storage (TES) unit (130), and the regenerator (280) while concurrently opening the first open air loop between regenerator (280) and the heat engine (300).

The regenerator (280) may comprise two Thermal Energy Storage (TES) units (280a, 280b) fluidly coupled in a parallel by a plurality of manifolds and a plurality of three-way valves for controlling the storage and retrieval high-temperature heat.

The regenerator (280) may comprise four Thermal Energy Storage (TES) units (280a, 280b, 280c, 280d) fluidly coupled to one another in a parallel by a plurality of manifolds and a plurality of two-way valves for controlling the storage and retrieval high-temperature heat.

The first pressure may be atmospheric pressure.

The second pressure and the third pressure may be greater than atmospheric pressure.

According to an embodiment, and still referring to FIGS. 7 and 8, there is provided a method for energy storage and retrieval system for the generation of power and heat, the method comprising:

providing the energy storage and retrieval system for the generation of power, an energy storage and retrieval system for the generation of power, comprising:

a thermal medium for storing energy in the form of heat;

an electrical machine (304) mounted on a first shaft (310) comprising:

a first clutch (309) mechanically coupled to a first expander (307) of a charging assembly (700), the charging assembly configured to store high temperature heat at a first pressure, the charging assembly (700) comprising: a heat pump system (400) mechanically coupled to the electrical machine (304), the heat pump system comprising a second shaft (308) mechanically coupled to a first compressor (306) and to the first expander (307); and a second clutch (305) mechanically coupled to a second compressor (301) of a discharging assembly (800), the discharging assembly configured to generate mechanical power from heat at the first pressure, the discharging assembly comprising: a heat engine (300) mechanically coupled to the electrical machine (304), the heat engine (300) comprising a third shaft (303) mechanically coupled to the second compressor (301) and to a second expander (302);

a regenerator (280) comprising Thermal Energy Storage (TES) units comprising the thermal medium and configured to operate at a second pressure in the charging mode and at a third pressure in the discharging mode, the regenerator (280) fluidly coupled by a plurality of manifolds and a plurality of valves for controlling the storage and retrieval high-temperature heat, the regenerator (280) fluidly coupled via a first three-way valve (501) to the first compressor (306) and the second expander (302), and the regenerator (280) fluidly coupled via a second three-way valve (502) to the second compressor (301) and the first expander (307), wherein the first Thermal Energy Storage (TES) unit (120) is fluidly coupled to the regenerator (280) and is configured to store and retrieve heat at the first pressure; and a second Thermal Energy Storage (TES) unit (130) fluidly coupled to the first compressor (306), the first expander (307), and the second expander (302), wherein the second Thermal Energy Storage (TES) unit (130) is configured to store and retrieve heat at the first pressure, wherein in a charging configuration, the first clutch (309) engages the electrical machine (304) to the heat pump (400), the second clutch (305) disengages the electrical machine (304) from the heat engine (300), the first three-way valve (501) and the second three-way valve (502) activates a first closed air loop between the heat pump system (400), the second Thermal Energy Storage (TES) unit (130) and the regenerator (280), while concurrently closing a first open air loop between regenerator (280) and the heat engine (300), and wherein in a discharging configuration, the first clutch (309) disengages the electrical machine (304) from the heat pump (400), the second clutch (305) engages the electrical machine (304) to the heat engine (300), the first three-way valve (501) and the second three-way valve (502) closes the first closed air loop between the heat pump system (400), the second Thermal Energy Storage (TES) unit (130), and the regenerator (280) while concurrently opening the first open air loop between regenerator (280) and the heat engine (300);

providing ambient air at a first pressure, while the second and third pressures may be greater than the first pressure;

charging the system with heat; and/or discharging the system off heat.

Referring now to FIG. 7, according to an embodiment, there is provided a method for charging the energy storage and retrieval system, the method comprising:

providing the energy storage and retrieval system for the storing of power an energy storage and retrieval system for the storing of power, comprising:

a thermal medium for storing energy in the form of heat;

an electrical machine (304) mounted on a shaft (310) comprising:

a first clutch (309) mechanically coupled to a first expander (307) of a charging assembly (700), the charging assembly configured to store high temperature heat at a first pressure, the charging assembly (700) comprising: a heat pump system (400) mechanically coupled to the electrical machine (304), the heat pump system comprising a shaft (308) mechanically coupled to a first compressor (306) and to the first expander (307); and a regenerator (280) comprising a Thermal Energy Storage (TES) units comprising the thermal medium and configured to operate at a second pressure, the regenerator (280) fluidly coupled by a plurality of manifolds and a plurality of valves for controlling the storage and retrieval high-temperature heat, the regenerator (280) fluidly coupled via a first three-way valve (501) to the first compressor (306), and the regenerator (280) fluidly coupled via a second three-way valve (502) to the first expander (307), wherein the second Thermal Energy Storage (TES) unit (120) is fluidly coupled to the regenerator (280) and is configured to store and retrieve heat at the first pressure; and a second Thermal Energy Storage (TES) unit (130) fluidly coupled to the first compressor (306) and the first expander (307), wherein the second Thermal Energy Storage (TES) unit (130) is configured to store and retrieve heat at the first pressure, wherein in a charging configuration, the first three-way valve (501) and the second three-way valve (502) activates a first closed air loop between the heat pump system (400), the second Thermal Energy Storage (TES) unit (130) and the regenerator (280), while concurrently closing a first open air loop between regenerator (280) and the heat engine (300);

providing ambient air at a first pressure;

charging the system with heat, comprising the steps of:

activating the charging assembly (700) by engaging the first clutch 309 and disengaging the second clutch 305, actioning the first three-way valve (501) and the second three-way valve (502) to open an air loop between the a heat pump system (400) and the regenerator (280), and to close an air loop between the regenerator (280) and the a heat engine (300);

directing the ambient air through the second Thermal Energy Storage (TES) unit (130) onto the first compressor (306);

pressurizing the air to a high temperature at a second pressure;

directing the pressurized heated air to regenerator (280) to deliver high-temperature heat to regenerator (280);

directing air after regenerator (280) at the second pressure to the first expander (307) for power generation and partially power the first compressor (306);

sending the outlet air of the second compressor to the second Thermal Energy Storage (TES) unit (130) to capture heat; and, powering the heat pump (400) by the electrical machine (304) through the first clutch (305).

The air loop between the heath pump system (400) and the regenerator (280) is a closed loop.

The closed air loop between the regenerator (280) and the first Thermal Energy Storage (TES) unit (120) is at or under ambient pressure.

The step of charging the system with heat further comprises the step of:

directing the pressurized heated air to first expander (307) for mechanical power generation.

Referring now to FIG. 8, according to an embodiment, there is provided a method for energy storage and retrieval system for the generation of power and heat, the method comprising:

providing the energy storage and retrieval system for the generation of power an energy storage and retrieval system for the generation of power, comprising:

a thermal medium for storing energy in the form of heat;

an electrical machine (304) mounted on a shaft (310) comprising:

a second clutch (305) mechanically coupled to a second compressor (301) of a discharging assembly (800), the discharging assembly configured to generate mechanical power from heat at the first pressure, the discharging assembly comprising: a heat engine (300) mechanically coupled to the electrical machine (304), the heat engine (300) comprising a shaft (303) mechanically coupled to the second compressor (301) and to a second expander (302);

a regenerator (280) comprising Thermal Energy Storage (TES) units comprising the thermal medium and configured to operate at a third pressure, the regenerator (280) fluidly coupled by a plurality of manifolds and a plurality of valves for controlling the storage and retrieval high-temperature heat, the regenerator (280) fluidly coupled via a first three-way valve (501) to the second expander (302), and the regenerator (280) fluidly coupled via a second three-way valve (502) to the second compressor (301), wherein the first Thermal Energy Storage (TES) unit (120) is fluidly coupled to the regenerator (280) and is configured to store and retrieve heat at the first pressure; and a second Thermal Energy Storage (TES) unit (130) fluidly coupled to the second expander (302), wherein the second Thermal Energy Storage (TES) unit (130) is configured to store and retrieve heat at the first pressure, wherein in a discharging configuration, the first three-way valve (501) and the second three-way valve (502) closes the first closed air loop between the heat pump system (400), the second Thermal Energy Storage (TES) unit (130), and the regenerator (280) while concurrently opening the first open air loop between regenerator (280) and the heat engine (300);

providing ambient air at a first pressure; and discharging the system off heat, comprising the steps of:

activating the discharging assembly (800) by engaging the second clutch (305) to the electrical machine and disengaging the first clutch (309) from the electrical machine (304), actioning the first three-way valve (501) and the second three-way valve (502) to close the air loop between the a heat pump system (400) and the regenerator (280), and to open the air loop between the regenerator (280) and the heat engine (300), activating the second compressor to pressurize the ambient air at a second pressure;

directing the pressurized air to regenerator (280) to capture the heat;

directing the heated pressurized air to the second expander (302) for mechanical power generation;

directing the output air of the second expander (302) to the second Thermal Energy Storage (TES) unit (130) to heat up the second Thermal Energy Storage (TES) unit (130); and, circulating air at the first pressure between the first Thermal Energy Storage (TES) unit (120) and the regenerator (280) to feed the regenerator (280) with high-temperature heat for operation of the heat engine (300).

The step of discharging the system off heat may further comprise the steps of:
- generating a medium temperature air at the output of the second expander (302);
- directing the medium temperature air through the second Thermal Energy Storage (TES) unit (130) to off load heat to the thermal medium and produce a low temperature air flow, wherein the low temperature air flow is selected for use in space heating, water heating, process feed heating, as preheated air in a boiler, a furnace, or an oven, and process heating applications.

In charging mode, the Heath Pump system may receive electricity as well as mid-quality heat at typically 500° C. from second Thermal Energy Storage (TES) unit (130), and delivers high-quality heat at typically 800° C. to the first Thermal Energy Storage (TES) unit (120).

The air on the heat engine (300) may be at an open loop.

The first pressure may be atmospheric pressure.

The second pressure and the third pressure may be greater than atmospheric pressure.

The first Thermal Energy Storage (TES) unit (120) and second Thermal Energy Storage (TES) unit (130) may be operable under or at atmospheric pressure, which reduces the cost of energy storage.

When longer than four hours of energy storage is required, the total installed cost of the system may be below Li ion batteries.

In the discharging mode, the high-quality heat from first Thermal Energy Storage (TES) unit (120) may drive the Heat engine (300) to generate electricity and deliver mid-quality heat to the second Thermal Energy Storage (TES) unit (130), as well as some heat surplus (205) for space heating, water heating, or process heating.

The invention claimed is:

1. An energy storage and retrieval system for the generation of power from a heat stream, the system comprising:
   - a thermal medium for storage and retrieval of thermal energy;
   - a regenerator comprising at least two Thermal Energy Storage (TES) units comprising the thermal medium, the at least two TES units fluidly coupled in a parallel configuration by a plurality of manifolds and a plurality of valves for controlling a coordinated aperture and closure of the plurality of valves for storage and retrieval of the thermal energy;
   - wherein a first set of valves controls a first flow of cold source into one of the at least two TES units;
   - wherein a second set of valves controls the first flow of cold source leaving the one of the at least two TES units;
   - wherein a third set of valves controls a first flow of heat source to another one of the at least two TES units;
   - wherein a fourth set of valves controls the first flow of heat source leaving the another one of the at least two TES units; and
   - wherein thermal energy is seamlessly transferred from the first flow of heat source to the first flow of cold source; and
   - a heat engine comprising an electrical machine comprising a combined synchronous electrical motor-generator, the electrical machine being mounted on a first shaft, the electrical machine being mechanically coupled to a first compressor and to a first expander, the first compressor and the first expander being in fluid communication with the regenerator, wherein the first compressor receives ambient air at a first pressure and pressurizes the ambient air at a second pressure to produce a pressurized air flow, and wherein the pressurized air flow passes through the regenerator producing heated pressurized air, and directing the heated pressurized air onto the first expander to produce mechanical power to drive the first compressor and to drive the synchronous electrical motor-generator to generate electricity.

2. The energy storage and retrieval system of claim 1, wherein the heat stream is hot air or industrial waste heat.

3. The energy storage and retrieval system of claim 1, the system comprising third and fourth TES units, the third TES unit fluidly coupled to the first expander, a second compressor and a second expander, and wherein the fourth TEST unit fluidly coupled to the at least two TES units in a parallel configuration.

4. The energy storage and retrieval system of claim 1, wherein the plurality of valves are two-way valves or three-way valves.

5. The energy storage and retrieval system of claim 1, wherein the first pressure is atmospheric pressure and the second pressure is greater than atmospheric pressure.

6. The energy storage and retrieval system of claim 3, wherein the thermal medium is a granular natural material such as gravel, rocks, and ores, such as iron ore, or a mixture thereof, having a particle size between 10 mm to 100 mm and a ragged surface and of irregular shape.

7. The energy storage and retrieval system of claim 3, wherein the at least two TES units, the third and fourth TES units comprise the thermal medium inside a vessel, the vessel being of generally a circular or a rectangular shape, and wherein the vessel is equipped with insulation to maintain the stored heat.

8. The energy storage and retrieval system of claim 3, wherein the third and fourth TES units store thermal energy for later use in the generation of mechanical power.

9. The energy storage and retrieval system of claim 3, wherein the fourth TES unit is in fluid communication with the at least two TES units; wherein the regenerator is configured to operate at the first pressure allowing air to flow in a closed cycle between the at least two TES units and the fourth TES unit; wherein the regenerator is configured to operate at a second pressure allowing air to flow from the first compressor to the regenerator and to the first expander; and wherein the regenerator is coupled to the first compressor for pressurizing ambient air, the pressurized air flowing in an open cycle including, in sequence, from the first compressor, to the regenerator, to the first expander, and to the third TES unit for generating mechanical power.

10. The energy storage and retrieval system of claim 3, wherein the fourth TES unit provides for the storage and retrieval high-temperature thermal energy.

11. The energy storage and retrieval system of claim 3, wherein the third TES unit provides for the storage and retrieval medium-temperature thermal energy.

12. The energy storage and retrieval system of claim 1, wherein the electrical machine comprises:
   - a first clutch mechanically coupled to a second expander of a charging assembly, the charging assembly configured to store high-temperature thermal energy at the first pressure, the charging assembly comprising: a heat pump system mechanically coupled to the electrical machine, the heat pump system comprising a second shaft mechanically coupled to a second compressor and to the second expander; and
   - a second clutch mechanically coupled to a third shaft of a discharging assembly, the discharging assembly configured to generate mechanical power from heat at the first pressure, the discharging assembly comprising: a heat engine mechanically coupled to the electrical machine, the heat engine comprising the third shaft mechanically coupled to the first compressor and to the first expander; and wherein the regenerator is configured to operate at the second pressure, the regenerator being fluidly coupled via a first three-way valve to the first compressor and to the second expander, and the regenerator being fluidly coupled via a second three-way valve to the second compressor and the first expander, wherein a fourth TES unit is fluidly coupled to the regenerator through a closed air loop configured to operate at the first pressure, and wherein a third TES unit is fluidly coupled to the second compressor, the second expander, and the first expander, the third TES unit being configured to store and retrieve thermal energy at the first pressure.

13. The energy storage and retrieval system of claim 12, the system comprising a charging and a discharging configuration, wherein in the charging configuration, the first three-way valve and the second three-way valve activate a first closed air loop between the heat pump system, the third TES unit and the regenerator, while concurrently closing a first open air loop between regenerator and the heat engine, and wherein in the discharging configuration, the first three-way valve and the second three-way valve closes the first closed air loop between the heat pump system, the third TES unit, and the regenerator, while concurrently opening the first open air loop between the regenerator and the heat engine.

14. The energy storage and retrieval system of claim 12 comprising an electrical heater fluidly coupled to the fourth TES unit, wherein the electrical heater converts excess electricity into thermal energy for storage in the fourth TES unit and later retrieval.

15. The energy storage and retrieval system of claim 12, wherein the fourth TES unit provides for the storage and retrieval high-temperature thermal energy.

16. The energy storage and retrieval system of claim 12, wherein the third TES unit provides for the storage and retrieval medium-temperature thermal energy.

17. The energy storage and retrieval system of claim 12, wherein the first pressure is atmospheric pressure and the second pressure is greater than atmospheric pressure.

18. A method for thermal energy storage and retrieval for the generation of power from the stored thermal energy, the method comprising:
provinding the energy storage and retrieval system of claim 12;
charging the system with heat, comprising the steps of:
activating the charging assembly by engaging the first clutch and disengaging the second clutch and by actioning the first three-way valve and the second three-way valve to open an air loop between the heat pump system and the regenerator, and to close an air loop between the regenerator and the heat engine;
directing an output air of the second expander at the first pressure through the third TES unit onto the second compressor;
pressurizing the air to a high temperature at a second pressure;
directing the pressurized heated air to the regenerator;
delivering heat to the regenerator, wherein heat is directed to the fourth TES unit for storage;
sending a pressurized cooled air to the second expander for power generation and partially energizing the second compressor;
driving the heat pump system by energizing the electrical machine with electricity; or
discharging the system off heat for the generation of power and thermal energy, comprising the steps of:
activating the discharging assembly by disengaging the first clutch and engaging the second clutch and by actioning the first three-way valve and the second three-way valve to close the air loop between the heat pump system and the regenerator, and to open the air loop between the regenerator and the heat engine,
activating the first compressor to pressurize the ambient air at a third pressure;
directing the pressurized air to regenerator to capture the heat from the regenerator;
directing the pressurized heated air to the first expander for mechanical power generation, actioning the first compressor and the electrical machine for electricity generation; and
circulating air at the first pressure between fourth TES unit and the regenerator, providing the thermal energy required for the operation of the first expander.

19. The method of claim 18, wherein the step of discharging the system off heat further comprises the step of:
directing a medium temperature air at the first pressure from the first expander through the third TES unit to off load heat to the thermal medium and produce a low temperature air flow, wherein the low temperature air flow is selected for use in space heating, water heating, process feed heating, as preheated air in a boiler, a furnace, or an oven, and other process heating applications.

20. The method of claim 18, wherein the first pressure is atmospheric pressure and the second pressure and the third pressure are greater than atmospheric pressure.

* * * * *